(12) United States Patent
Meeker et al.

(10) Patent No.: US 9,347,792 B2
(45) Date of Patent: May 24, 2016

(54) SYSTEMS AND METHODS FOR DISPLAYING IMAGES WITH MULTI-RESOLUTION INTEGRATION

(75) Inventors: John Meeker, Alburquerque, NM (US); John Cunningham, Alburquerque, NM (US); David Baughman, Alburquerque, NM (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 140 days.

(21) Appl. No.: 13/285,598

(22) Filed: Oct. 31, 2011

(65) Prior Publication Data

US 2013/0106832 A1 May 2, 2013

(51) Int. Cl.
| | |
|---|---|
| G06T 15/00 | (2011.01) |
| G06T 17/00 | (2006.01) |
| G01C 23/00 | (2006.01) |
| G01C 21/36 | (2006.01) |
| G06T 17/05 | (2011.01) |

(52) U.S. Cl.
CPC ............ *G01C 23/00* (2013.01); *G01C 21/3638* (2013.01); *G06T 17/05* (2013.01)

(58) Field of Classification Search
CPC ...... A61B 5/1117; A61B 5/681; A61B 5/726; G06F 3/017; G06F 3/013; G06F 3/011; G06B 27/01; G06B 2027/0178; G01R 33/5601; G01R 33/5608; G06T 19/006; G06T 2219/024; H04L 67/38
USPC ....................................................... 345/419
See application file for complete search history.

(56) References Cited

U.S. PATENT DOCUMENTS

| | | | |
|---|---|---|---|
| 4,348,186 | A | 9/1982 | Harvey et al. |
| 4,615,013 | A | 9/1986 | Yan et al. |
| 5,699,497 | A | 12/1997 | Erdahl et al. |

(Continued)

FOREIGN PATENT DOCUMENTS

| | | | |
|---|---|---|---|
| DE | 102009020737 | A1 | 5/2010 |
| EP | 1435507 | A2 | 7/2004 |
| EP | 2244239 | A2 | 10/2010 |

OTHER PUBLICATIONS

EP Search Report, EP 12181923.9-1557 dated Nov. 3, 2013.

(Continued)

*Primary Examiner* — Gregory J Tryder
*Assistant Examiner* — Kwang Lee
(74) *Attorney, Agent, or Firm* — Ingrassia Fisher & Lorenz, P.C.

(57) ABSTRACT

A display system is provided for a vehicle. The system includes a first data source configured to provide low resolution terrain data; a second data source configured to provide high resolution terrain data; a processing unit coupled to the first data source and the second data source, the processing unit configured to receive the low resolution terrain data and high resolution terrain data, to integrate the low resolution terrain data and the high resolution terrain data into a common three-dimensional view that includes graphical elements representing both the low and the high resolution terrain data, and to supply display commands associated with the low and the high resolution terrain data; and a display device coupled to the processing unit and configured to receive the display commands and operable to render the common three-dimensional view to thereby allow simultaneous viewing of the low and the high resolution terrain data.

15 Claims, 4 Drawing Sheets

(56) References Cited

U.S. PATENT DOCUMENTS

| | | | |
|---|---|---|---|
| 5,949,425 A | 9/1999 | Willis | |
| 5,969,723 A | 10/1999 | Schmidt | |
| 6,747,649 B1 | 6/2004 | Sanz-Pastor et al. | |
| 6,781,606 B2 * | 8/2004 | Jouppi | 345/698 |
| 6,809,731 B2 | 10/2004 | Muffler et al. | |
| 7,123,260 B2 | 10/2006 | Brust | |
| 7,305,396 B2 | 12/2007 | Schmidt et al. | |
| 7,436,405 B2 * | 10/2008 | Losasso Petterson et al. | 345/428 |
| 7,564,455 B2 * | 7/2009 | Gatewood et al. | 345/419 |
| 7,612,775 B2 | 11/2009 | Goyne et al. | |
| 7,626,591 B2 | 12/2009 | Crawfis et al. | |
| 7,675,461 B1 * | 3/2010 | McCusker et al. | 342/179 |
| 2003/0195672 A1 | 10/2003 | He | |
| 2006/0080072 A1 * | 4/2006 | Lachman et al. | 703/7 |
| 2006/0208927 A1 * | 9/2006 | Poor et al. | 340/995.1 |
| 2008/0215204 A1 | 9/2008 | Roy et al. | |

OTHER PUBLICATIONS

EP Exam Report, EP 12 181 923.9 dated Apr. 8, 2013.

* cited by examiner

SYSTEMS AND METHODS FOR DISPLAYING IMAGES WITH MULTI-RESOLUTION INTEGRATION

STATEMENT REGARDING FEDERALLY SPONSORED RESEARCH OR DEVELOPMENT

This invention was made with Government support under W91215-10-C-0003 awarded by USASOC Technology Application Program Office. The Government has certain rights in the invention.

TECHNICAL FIELD

The present invention generally relates to aircraft display systems and methods and, more particularly, to systems and methods that display images representing terrain data.

BACKGROUND

Computer generated aircraft displays have become highly sophisticated and capable of displaying a substantial amount of flight management, navigation, and control information that gives flight crews more effective control of the aircraft and a reduction in workload. In this regard, electronic displays, such as Heads-Up Displays (HUDs) and Heads-Down Displays (HDDs), are used in aircraft as Primary Flight Displays to display important flight management, navigation, and control information to flight crews. For example, the Primary Flight Display can combine critical flight instrumentation (e.g., altitude, attitude, heading, airspeed, vertical speed instruments) and primary engine instrument indicators into a single, readily interpretable display.

Some Primary Flight Displays may provide a 3D, synthetic perspective view of the terrain surrounding the aircraft, including man-made and natural terrain. Examples include Synthetic Vision Systems (SVSs). These images are typically based on pre-loaded and predetermined terrain data from a database or terrain data from a sensor system. Storing and processing large amounts of this terrain data may be difficult, especially at a level of detail desired for a synthetic display.

Accordingly, it is desirable to provide systems and methods with improved rendering of terrain data on a visual display, such as, for example, a Primary Flight Display, similar electronic aircraft displays, and other types of electronic displays. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a display system is provided for a vehicle. The display system includes a first data source configured to provide low resolution terrain data; a second data source configured to provide high resolution terrain data; a processing unit coupled to the first data source and the second data source, the processing unit configured to receive the low resolution terrain data and high resolution terrain data, to integrate the low resolution terrain data and the high resolution terrain data into a common three-dimensional view that comprises graphical elements representing both the low resolution terrain data and the high resolution terrain data, and to supply display commands associated with the low resolution terrain data and the high resolution terrain data; and a display device coupled to the processing unit and configured to receive the display commands and operable to render the common three-dimensional view to thereby allow simultaneous viewing of the low resolution terrain data and the high resolution terrain data.

In accordance with another exemplary embodiment, a method is provided for displaying multi-resolution terrain data. The method includes receiving low resolution terrain data from a first data source; receiving high resolution terrain data from a second data source; blending the low resolution terrain data and the high resolution terrain data into a field of view (FOV); and producing display signals for the FOV

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide visual display systems and methods for aircraft. More specifically, the visual display systems and methods display images of terrain data integrated from a first data source with low resolution terrain data and a second data source with high resolution terrain data.

Figure 1:
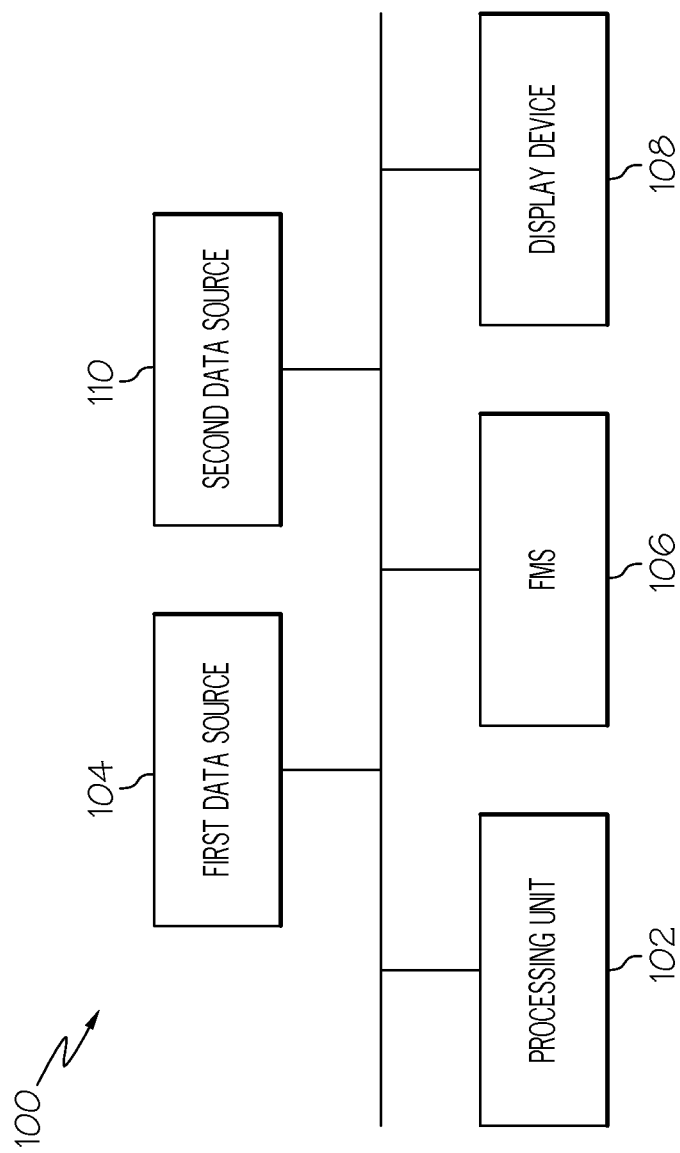
FIG. 1 is a functional block diagram of an aircraft display system in accordance with an exemplary embodiment.

FIG. 1 depicts a block diagram of an exemplary aircraft visual display system 100 for displaying images with integrated high resolution terrain data and low resolution terrain data. In the exemplary embodiment shown, the system 100 includes a processing unit 102, a first data source 104, a flight management system 106, a display device 108, and a second data source 110. Although the system 100 appears in FIG. 1 to be arranged as an integrated system, the system 100 is not so limited and can also include an arrangement whereby one or more of the processing unit 102, the first data source 104, the flight management system 106, the display device 108, and the second data source 110 are separate components or subcomponents of another system located either onboard or external to an aircraft. Also, for example, the system 100 can be arranged as an integrated system (e.g., aircraft display system, Primary Flight Display system, a Head Up Display with SVS or EVS as an overlay (or underlay), a "near to eye display" system, or a head mounted display system, etc.) or a subsystem of a more comprehensive aircraft system (e.g., flight management system, navigation and control system, target aiming and control system, collision alert and/or avoidance system, weather avoidance system, etc.). The system 100 can be utilized in an aircraft, such as a helicopter, airplane, or unmanned vehicle. Moreover, exemplary embodiments of the system 100 can also be utilized in spacecraft, ships, submarines, fixed wing and rotor aircraft, such as helicopters, as well as other types of vehicles. For simplicity, embodiments are described below with reference to "aircraft."

The processing unit 102 can be a computer processor associated with a Primary Flight Display. Generally, the processing unit 102 receives and/or retrieves flight management information (e.g., from the flight management system 106) and landing, target and/or terrain information (e.g., from first data source 104 or second data source 110). The processing unit 102 generates display control signals for flight management information, which includes navigation and control symbology such as a zero pitch reference line, heading indicators, tapes for airspeed and altitude, flight path information, RNP information, and any other information desired by a flight crew. As discussed in further detail below, the processing unit 102 additionally receives and integrates terrain data from the first data source 104 and second data source 110, and generates display control signals based on the integrated terrain data. The processing unit 102 then sends the generated display control signals to a display device (e.g., the display device 108). More specific functions of the processing unit 102 will be discussed below.

The first data source 104 and the second data source 110 are coupled to the processing unit 102 and may be any suitable type of data source and may be the same or different types of data source. As described below, the first data source 104 may include low resolution terrain data, and the second data source 110 may include high resolution terrain data. The low resolution terrain data and the high resolution terrain data may be stored, for example, according to latitude and longitude coordinates. In one exemplary embodiment, the first and second data sources 104 and 110 are disparate data sources.

The first and second data sources 104 and 110 each include regularly spaced elevation values, not necessarily geometrically or linearly spaced but often regularly spaced in degree space. As suggested by the labels, high resolution data has a higher resolution than the low resolution data. For example, in one exemplary embodiment, low resolution data may include elevation or height field values with post spacings of 3 to 6 arc seconds (90 to 185 meters, respectively), whereas high resolution elevation or height field data may have post spacings of 1 meter or less (for example, BuckEye data) to result in a significant difference in resolution. In one exemplary embodiment, the low resolution data and high resolution data may have spacing differences on the order of 1 to 2 orders of magnitude (e.g., 10× or 100× differences in spacing). Generally, high resolution data and low resolution data refers to lateral spacing. In exemplary embodiments, the high resolution terrain data and low resolution terrain data may be related to one another by a non-integer relationship or an integer relationship. In some embodiments, the high resolution terrain data and low resolution terrain data may have no predetermined relationship other than the differences in resolution between the two data sources 104 and 110.

In one exemplary embodiment, the first data source 104 and/or the second data source 110 may be a database with stored data. Such a database may be a memory device (e.g., non-volatile memory, disk, drive, tape, optical storage device, mass storage device, etc.) that can store digital landing, waypoint, and target location as either absolute coordinate data or as a function of an aircraft's position. The database can additionally include other types of navigation information, such as information used to calculate flight path and determine RNP information. The database can also include, for example, a terrain database, which includes the locations and elevations of natural and man-made terrain. The terrain can include obstacles, such as buildings and vehicles. Obstacle data can be stored together with terrain or in a separate obstacle only database. The geographic locations and height of the obstacles for typical avionics applications can be obtained through survey or through various reporting services.

As another example, the first data source 104 and/or second data source 110 may include any suitable sensor for detecting terrain and providing data to the processing unit 102 based on the detected terrain. Such a sensor system may include sensors such as radar or forward-looking infrared (FLIR). Other types of imaging sensors may include types such as visible light, millimeter-wave radar, X-band (weather) radar, etc. In one embodiment, the sensor system is a stand-alone system, although in other embodiments, the sensor system can be used to completely or partially verify database. The sensor collected data, after additional verifications, may be later inserted into such databases for future uses.

The flight management system 106 is coupled to processing unit 102, and can provide navigation data associated with the aircraft's current position and flight direction (e.g., heading, course, track, etc.) to the processing unit 102. The navigation data provided to the processing unit 102 can also include information about the aircraft's airspeed, altitude, pitch, and other important flight information. In exemplary embodiments, the flight management system 106 can include any suitable position and direction determination devices that are capable of providing the processing unit 102 with at least an aircraft's current position (e.g., in latitudinal and longitudinal form), the real-time direction (heading, course, track, etc.) of the aircraft in its flight path, the waypoints along the flight path, and other important flight information (e.g., airspeed, altitude, attitude, etc.). Such information can be provided to the processing unit 102 by, for example, an Inertial Reference System (IRS), Air-data Heading Reference System (AHRS), and/or a global positioning system (GPS).

The system 100 also includes the display device 108 coupled to the processing unit 102. The display device 108 may include any device or apparatus suitable for displaying various types of computer generated symbols and information representing at least pitch, heading, flight path, airspeed, altitude, landing information, waypoints, targets, obstacle, terrain, and RNP data in an integrated, multi-color or monochrome form. Using data retrieved (or received) from the flight management system 106 and/or data sources 104 and 110, the processing unit 102 executes one or more algorithms (e.g., implemented in software) for determining the position of the various types of desired information on the display device 108. The processing unit 102 then generates display control signals representing this data, and sends display control signals to the display device 108. The display device 108 and/or processing unit 102 may include a graphics display generator for generating the appropriate graphical elements on the screen of the display device 108, as discussed in greater detail below. In this embodiment, the display device 108 is an aircraft cockpit, multi-color display (e.g., a Primary Flight Display).

Although a cockpit display screen may be used to display the above-described flight information symbols and data, any suitable type of display medium capable of visually presenting multi-colored or monochrome flight information for a pilot or other flight crew member can be provided, such as, for example, various CRT and flat-panel display systems (e.g., CRT displays, LCDs, OLED displays, plasma displays, projection displays, HDDs, HUDs, etc.).

Figure 2:
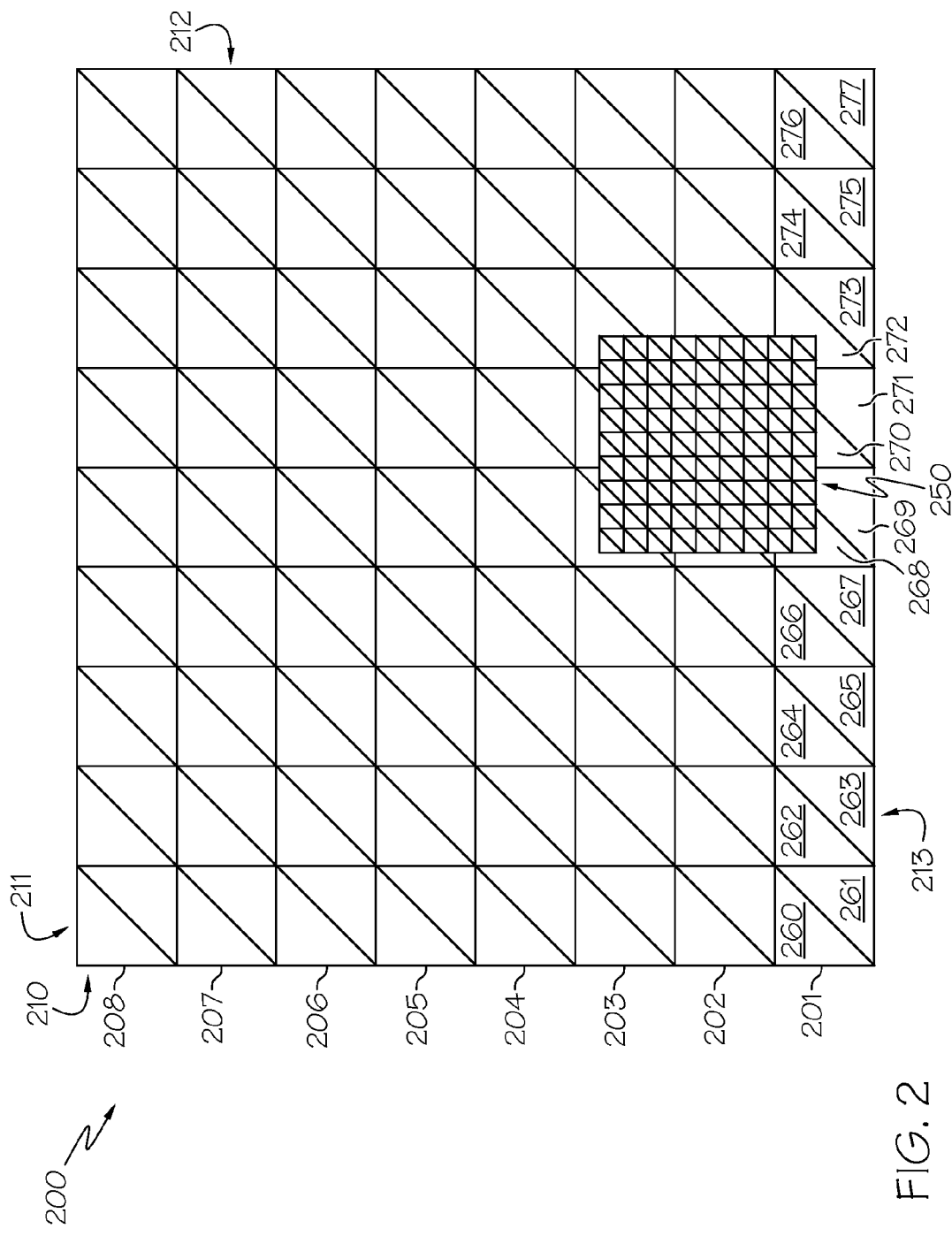
FIG. 2 is a schematic representation of a visual display with integrated high and low resolution terrain data in accordance with an exemplary embodiment.

FIG. 2 is a schematic representation of a visual display 200 of integrated high and low resolution terrain data. The schematic representation of the visual display 200 of FIG. 2 will be described briefly prior to a more detailed description of the method 300 for rendering the display 200. In one exemplary embodiment, the visual display 200 is rendered with a series of "mesh strips," each with a number of triangles or polygons that collectively form the terrain and other flight information formed on the display device 108. The size of the triangles generally corresponds to the resolution of the respective portion of the visual display 200. In the representation of visual display 200 of FIG. 2, the visual display 200 includes a number of low resolution strips 201-208 that may be sequentially formed to render the larger field of view (FOV) (or view frustum), defined by boundaries 210-213. As described above, the strips (e.g., strip 201) may be formed by triangles or polygons (e.g., triangles 260-277). As described in greater detail below, one or more portions of the visual display 200 may be formed with a high resolution patch 250 that replaces corresponding portions of the low resolution mesh (e.g., portions of strips 201-203). Additional details about the visual display 200 will be described with reference to the method 300 of FIG. 3, which describes a method for rendering the visual display 200 with integrated multi-resolution terrain data, such as the visual display 200 of FIG. 2 with the system 100 of FIG. 1.

In one embodiment, the method 300 is used for displaying terrain data in 3D, synthetic view for a Primary Flight Display of an aircraft, such as for example, the system 100 discussed above. As such, the method 300 of FIG. 3 will be described with reference to the system 100 of FIG. 1 and with reference the schematic representation of a visual display 200 of FIG. 2.

Figure 3:
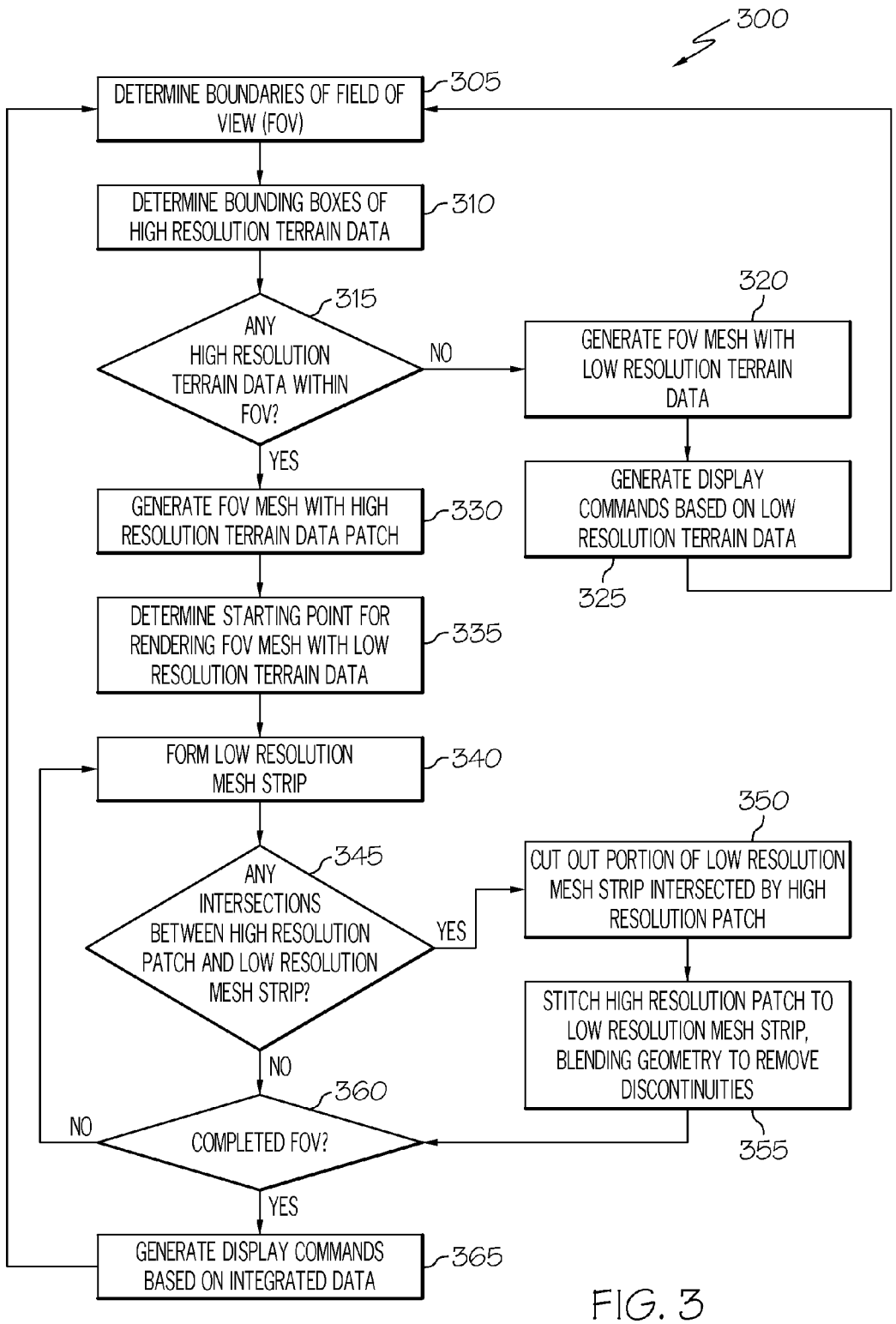
FIG. 3 is a flowchart describing a method for displaying images representing integrated high and low resolution terrain data in accordance with an exemplary embodiment.

In a first step 305 of the method 300 of FIG. 3, the processing unit 102 determines the boundaries of the field of view (FOV), e.g., the terrain that the pilot or operator is to view from the aircraft. As described above, in a Primary Flight Display, the FOV is the synthetic terrain that surrounds the aircraft as viewed from the cockpit or other vantage point. The boundaries of the FOV may be expressed as latitude/longitude data and transformed into a "real-world" coordinate system relative to the aircraft or an xyz-coordinate system of the display device 108. In the schematic representation of FIG. 2, the boundaries 210-213 of the FOV correspond to the edges of the visual display 200.

In a second step 310, the processing unit 102 determines bounding boxes associated with the high resolution terrain data of the second data source 110, e.g., the boundaries of high resolution terrain data available to the system 100. In most exemplary embodiments, the high resolution terrain data of the second data source 110 is limited to more important terrain data, such as static target locations, rendezvous positions, landing areas, the terrain along a planned flight path, or generally "points of interest," because of processing and storage capacity limitations. The bounding boxes of high resolution terrain data correspond to the geographical extent of the data, e.g., latitude/longitude data and/or extent (width and length) information. The bounding boxes may be a single patch of high resolution terrain data and/or a contiguous patch of sub-patches or noncontiguous patches of high resolution terrain data.

In a third step 315, the processing unit 102 compares the bounding boxes of the high resolution terrain data from the second data source 110 to the boundaries of the FOV, and the processing unit 102 determines if any portion of the bounding boxes of high resolution terrain data are within the FOV. If the bounding boxes of high resolution terrain data are not located in the FOV, the method 300 proceeds to step 320. As such, referring to FIG. 2, the processing unit 102 evaluates the bounding boxes of high resolution patches to determine if any patch falls within the boundaries 210-213 of the FOV. In the depicted example of FIG. 2, the high resolution patch 250 is one such patch that falls within the boundaries 210-213.

If, however, it is determined that the bounding boxes of the high resolution terrain data is not within the FOV, the method 300 proceeds to step 320. In step 320, the processing unit 102 generates a FOV mesh with low resolution terrain data from the first data source 104. As described above, the low resolution terrain data may be stored according to latitude/longitude and transformed according to the FOV. In the example of FIG. 2, the FOV mesh would include the strips 201-208 without any high resolution patch (e.g., without high resolution patch 250). In step 325, the processing unit 102 generates display commands based on the FOV mesh of low resolution terrain data for display on the display device 108.

Returning to step 315, if the processing unit 102 determines that the bounding boxes of high resolution terrain data are located within the FOV, in step 330, the processing unit 102 generates a FOV mesh for such high resolution terrain data, such as the high resolution patch 250 of FIG. 2.

In step 335, the processing unit 102 determines a starting point for rendering a FOV mesh with the low resolution terrain data. The starting point typically refers to an outer extent or corner of the FOV from which a mesh of the entire FOV may be constructed. For example, in FIG. 2, an exemplary starting point 215 may be a lower corner of the boundaries 210-213.

In step 340, the processing unit 102 forms a low resolution mesh strip from the low resolution terrain data of the first data source 104. Typically, the first FOV mesh strip is formed from the starting point of step 335. As shown in FIG. 2, in an initial iteration of step 340, the first low resolution mesh strip 201 is formed, and in subsequent iterations discussed below, subsequent low resolution mesh strips 202-208 may be formed.

In step 345, the processing unit 102 determines if there are any intersections between the current low resolution mesh strip and the high resolution patch. As an example, in FIG. 2, a portion (e.g., triangles 268-272) of the first low resolution mesh strip 201 intersects the high resolution patch 250.

If there are intersections between the low resolution mesh strip and the high resolution patch, in step 350, the processing unit 102 removes the portion of the low resolution mesh strip that intersects the high resolution patch. Referring to the example in FIG. 2, if the first low resolution mesh strip 201 is the current low resolution mesh strip, triangles 268-272 are removed.

In step 355, a portion of the high resolution terrain patch replaces the corresponding portion of low resolution mesh strip removed in step 350. Continuing the example of FIG. 2 in which the first low resolution mesh strip 201 is the current strip, triangles 268-272 are replaced by corresponding portions of the high resolution patch 250.

After step 355, the method 300 proceeds to step 360. Similarly, in step 345, if there are no intersections between the current low resolution mesh strip and the high resolution patch, the method 300 proceeds to step 360. In step 360, the processing unit 102 determines if the current low resolution mesh strip completes the FOV. For example, in FIG. 2, this does not occur until formation of low resolution mesh strip 208.

If the FOV is not complete, the method 300 proceeds to step 340 in which a subsequent low resolution mesh strip is formed adjacent to the previous low resolution mesh strip. Continuing the example above with FIG. 2, in step 340, the second low resolution mesh strip 202 is formed after an iteration with the first low resolution mesh strip 201. In steps 345, 350, 355, and 360, the processing unit 102 continues to determine intersections between the high resolution patch (or patches), removing portions of the low resolution mesh strips, replacing the removed portions of the low resolution mesh strips with corresponding portions of the high resolution patch, determining if the FOV is completed, and if not, repeating with a subsequent low resolution mesh strip. In FIG. 2, these steps result in the formation of low resolution mesh strips 201-208, and replacing portions of those mesh strips 201-208, if intersected, with portions of the high resolution patch 250, until the boundaries 210-213 of the visual display 200 is completed.

In step 365, the processing unit 102 generates display signals based on integrated low resolution and high resolution data in the FOV according to steps 305-360 and provides the display signals to the display device 108. The method 300 is repeated for each processing cycle of the system 100 to produce a continuously changing FOV image for the pilot.

Figure 4:
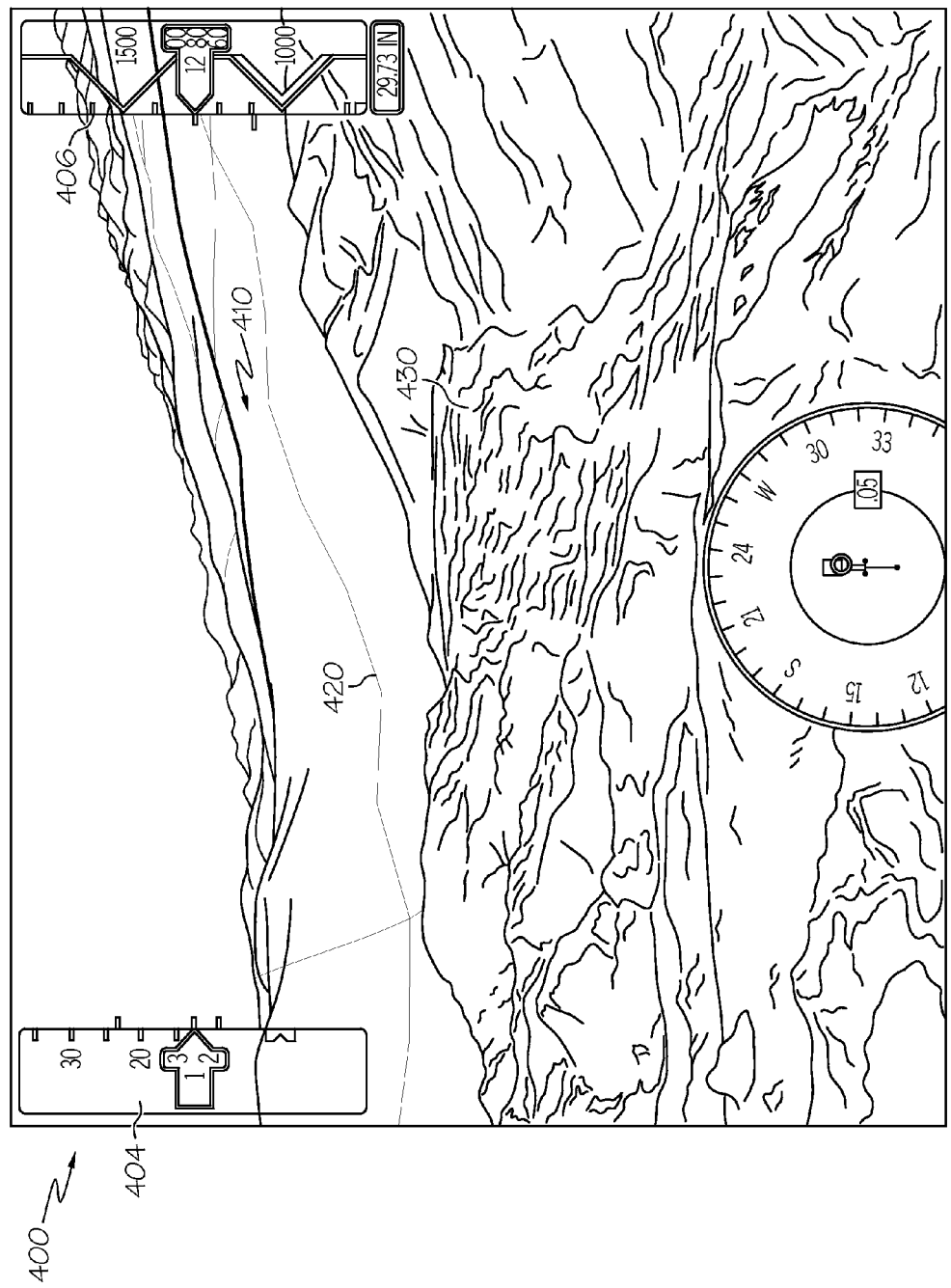
FIG. 4 depicts an exemplary image of the visual display rendered by the aircraft display system of FIG. 1 in accordance with an exemplary embodiment.

An exemplary visual display 400 is shown in FIG. 4. The visual display 400 is an exemplary visual display that may be rendered, for example, by the aircraft display system 100 of FIG. 1 and the method 300 of FIG. 3.

The visual display 400 shows, among other things, computer generated symbols and graphical elements representing an airspeed scale or tape 404, an altitude scale or tape 406, and terrain (e.g., identified generally as element 410). Other types of navigation and control symbology or graphical elements, such as a zero-pitch reference line, landing point, and the like may be provided, as necessary or desired. Although the visual display 400 is shown as an egocentric, first-person frame of reference, the visual display 400 can be a secondary, wingman, exocentric, and/or plan or perspective view that enables a viewer to view the aircraft, as well as zoom in and out, including an unmanned vehicle and/or spacecraft. Although the visual display 400 is generally associated with a Primary Flight Display, the display can also be utilized on a multi-function display, Head Up Display, and/or a head mounted display.

In this embodiment, the terrain 410 is rendered as a three-dimensional, perspective view. The terrain 410 can include any representation of the environment surrounding the aircraft, including flattened terrain. Additionally, the terrain 410 can include a virtual plane selected by a pilot at certain elevation relative to the aircraft and is rendered at that elevation.

In addition, and as will now be described in more detail, the visual display 400 may selectively render symbology forming part of the terrain 410 that represents low resolution terrain data from the first data source 104 and that represents high resolution terrain data from the second data source 110. One exemplary method 300 is described above in reference to FIG. 3 to illustrate how the low resolution terrain data from the first data source 104 and high resolution terrain data from the second data source 110 are blended and displayed.

As shown in FIG. 4, the first portion 420 of the terrain 410 corresponds to the low resolution terrain data of the first data source 104, and the second portion 430 of the terrain 310 corresponds to the high resolution terrain data. The high resolution terrain data of the second portion 430 is much more detailed and textured as compared to the low resolution terrain data of the first portion 420. As described above, the system 100 cuts or otherwise removes the low resolution terrain data and splices or patches the high resolution terrain data to provide the second portion 430 within the first portion 420. This embodiment may be in contrast to a system that down-samples resolutions from a single source of data.

Typically, the boundary between the portions 420 and 430 is evident from the difference in detail and no further marking of the boundary is necessary. However, in other embodiments, the boundary may be emphasized to the viewer.

Accordingly, systems and methods for combining high resolution terrain data and low resolution terrain data are provided. The systems and methods provide a display in which places of interest are shown in more detail with the high resolution terrain data while the other areas of the display are rendered with low resolution terrain data. Such a display provides increased situational awareness while enabling efficient processing and storage of terrain data.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for a vehicle, comprising:
   a first data source configured to provide low resolution terrain 3D geometry data;
   a second data source configured to provide high resolution terrain 3D geometry data;
   a processing unit coupled to the first data source and the second data source, the processing unit configured to receive the low resolution terrain 3D geometry data and high resolution terrain 3D geometry data, to integrate the low resolution terrain 3D geometry data and the high resolution terrain 3D geometry data into a common three-dimensional view that comprises graphical elements representing both the low resolution terrain 3D geometry data and the high resolution terrain 3D geometry data by forming at least one low resolution mesh strip of the low resolution terrain 3D geometry data corresponding to a FOV, identifying any intersections of a high resolution patch of the high resolution terrain 3D geometry data within the FOV and the at least one low resolution mesh strip, removing a portion of the at least one low resolution mesh strip intersected by the high resolution patch, patching the high resolution patch into the removed portion of the at least one low resolution mesh strip, and blending a boundary between the low resolution terrain 3D geometry data and the high resolution terrain 3D geometry data, and to supply display commands associated with the low resolution terrain 3D geometry data and the high resolution terrain data; and
   a display device coupled to the processing unit and configured to receive the display commands and operable to render the common three-dimensional view to thereby allow simultaneous viewing of the low resolution terrain 3D geometry data and the high resolution terrain 3D geometry data.

2. The display system of claim 1, wherein the first data source and the second data source are disparate data sources.

3. The display system of claim 1, wherein the high resolution terrain 3D geometry data of the second data source corresponds to a point of interest.

4. The display system of claim 1, wherein the first data source and the second data source are both databases.

5. The display system of claim 1, wherein the first data source and the second data source are different kinds of data sources.

6. The display system of claim 1, wherein the display device is a Primary Flight Display (PFD) or a Multi-Function Display (MFD).

7. The display system of claim 1, wherein the high resolution terrain 3D geometry data from the first data source has a first resolution relative to lateral spacing and the low resolution terrain 3D geometry data from the second data source has a second resolution relative to lateral spacing, the first resolution being at least an order of magnitude greater than the second resolution.

8. The display system of claim 1,
wherein the high resolution terrain 3D geometry data from the first data source includes elevation values with post spacings of 1 meter or less, and
wherein the low resolution terrain 3D geometry data from the second data source includes elevation values with post spacings of approximately 90 to 185 meters.

9. The display system of claim 1,
wherein, for a first latitude, longitude, and elevation coordinate,
the high resolution terrain 3D geometry data from the first data source includes the first latitude, longitude, and elevation coordinate at a first resolution,
the low resolution terrain 3D geometry data from the second data source includes the first latitude, longitude, and elevation coordinate at a second resolution, lower than the first resolution.

10. A method for displaying multi-resolution terrain data on an aircraft display, the method comprising:
determining boundaries of a field of view (FOV) of a user of the aircraft display;
storing low resolution terrain 3D geometry data in a first data source;
storing high resolution terrain 3D geometry data in a second data source, the high resolution terrain 3D geometry data at least partially grouped according a plurality of bounding boxes;
comparing the boundaries of the FOV to the bounding boxes of the high resolution terrain geometry data;
determining if a first portion of at least one of the bounding boxes is within the boundaries of the FOV;
if the first portion of the at least one of the bounding boxes is within the boundaries of the FOV
generating a high resolution patch for the high resolution terrain 3D geometry data within at least the first portion of the at least one of the bounding boxes within the boundaries of the FOV:
forming at least one low resolution mesh strip of low resolution terrain 3D geometry data corresponding to the FOV;
identifying any intersections between the high resolution patch and the at least one low resolution mesh strip;
removing a portion of the at least one low resolution mesh strip intersected by the high resolution patch;
patching the high resolution patch into the removed portion of the at least one low resolution mesh strip; blending the intersections of the high resolution patch and the at least one low resolution mesh strip to generate an integrated FOV image on the aircraft display; and
if the first portion of the at least one of the bounding boxes is outside of the boundaries of the FOV, generating a low resolution FOV image on the aircraft display.

11. The method of claim 10, wherein each of the integrated FOV image and the low resolution FOV image is a continuous, three dimensional perspective view.

12. The method of claim 10, wherein the high resolution terrain 3D geometry data has a resolution at least 10 times greater than the low resolution terrain 3D geometry data with respect to lateral spacing.

13. The method of claim 10, wherein the high resolution terrain 3D geometry data has a resolution with a non-integer relationship relative to the low resolution terrain 3D geometry data.

14. The method of claim 10, wherein the blending and generating steps include rendering the integrated FOV image and the low resolution FOV image on a Primary Flight Display (PFD) or a Multi-Function Display (MFD).

15. A method for displaying multi-resolution terrain data in a field of view (FOV), the method comprising:
receiving low resolution terrain 3D geometry data from a first data source;
forming a low resolution mesh from the low resolution terrain 3D geometry data corresponding to the FOV;
reviewing high resolution terrain 3D geometry data from a second data source for high resolution terrain data associated with the FOV;
generating a high resolution patch from the high resolution terrain 3D geometry data corresponding to the FOV;
identifying any intersections between the high resolution patch and the low resolution mesh;
removing a portion of the low resolution mesh intersected by the high resolution patch;
patching the removed portion of the low resolution mesh with at least a portion of the high resolution patch;
blending the resulting low resolution terrain 3D geometry data and the high resolution terrain 3D geometry data into a continuous, three-dimensional perspective view of integrated high resolution terrain 3D geometry data and low resolution terrain 3D geometry data, the high resolution terrain 3D geometry data having a resolution higher than the low resolution terrain 3D geometry data and having a non-integer relationship; and
producing display signals for the FOV.

* * * * *